May 25, 1926.
P. B. STREICH
ARTIFICIAL BAIT
Filed Nov. 4, 1925
1,585,943
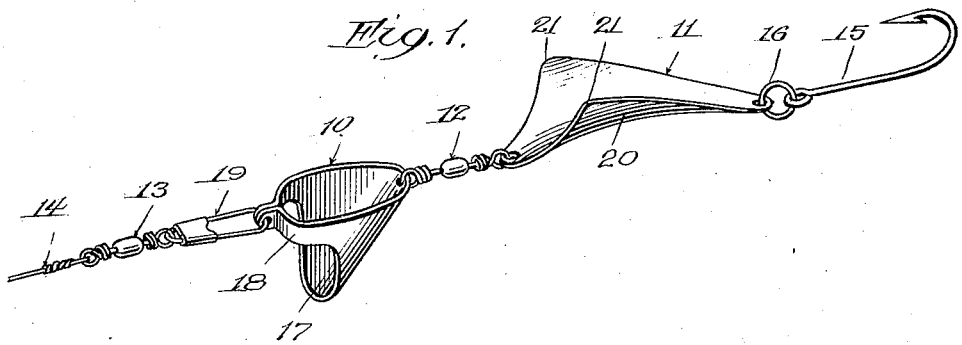
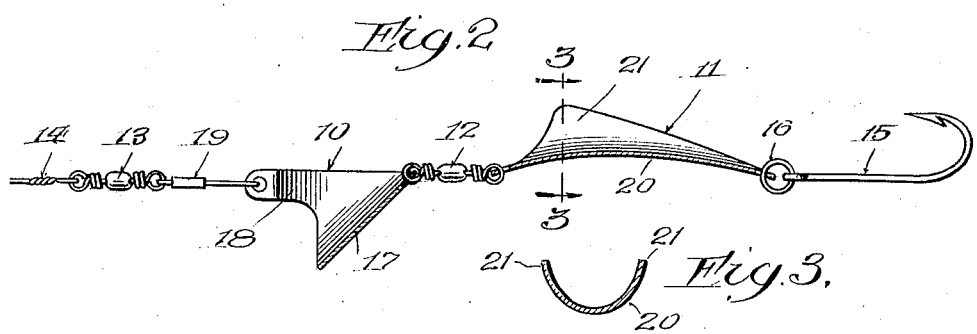
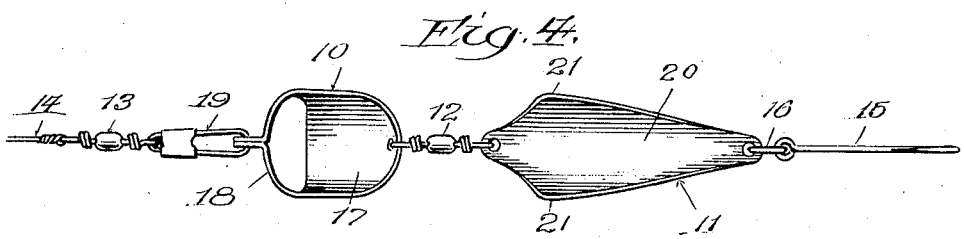
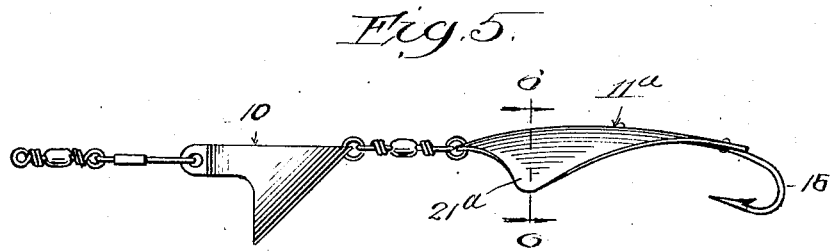
Inventor:
Paul B. Streich,
by Charles Hervey
his Atty.

Patented May 25, 1926.

1,585,943

UNITED STATES PATENT OFFICE.

PAUL B. STREICH, OF JOLIET, ILLINOIS, ASSIGNOR TO STREICH MANUFACTURING CO., OF JOLIET, ILLINOIS, A CORPORATION OF ILLINOIS.

ARTIFICIAL BAIT.

Application filed November 4, 1925. Serial No. 66,692.

This invention relates to artificial bait for use in fishing, and its principal object is to provide an artificial bait device composed of two joined pieces or sections, each of which effects the direction of movement of the other, whereby the device takes an irregular path when drawn through the water and darts or lunges in almost all directions, in a succession of swift movements, thereby making an attractive lure for the fish. The invention consists in a two piece artificial bait, loosely joined together, as by a swivel joint, and each piece having a curved trough like inclined direction controlling plane or surface which is inclined with respect to the length of the piece, whereby each piece is caused to take movements at angles to the line of draft, and each piece effecting the directions of movement of the other. The invention further consists in the several novel features hereinafter fully set forth and claimed.

The invention is clearly illustrated in the accompanying drawing, in which:—

Fig. 1 is a perspective view of an artificial bait device embodying one form of the present invention; Fig. 2 is a central, longitudinal section through the same; Fig. 3 is a detail, vertical, cross section taken on the line 3—3 of Fig. 2; Fig. 4 is a plan of the device; Fig. 5 is a side elevation of a slightly modified form of the invention and Fig. 6 is a detail, vertical, cross section taken on line 6—6 of Fig. 5.

Referring to said drawing and first to Figs. 1 to 4 inclusive, the reference character 10 designates the front piece or section, and 11 the back piece or section of an artificial bait device, embodying one form of the present invention, which pieces are loosely joined together by a swivel connection 12. A swivel connecting device 13 is secured to the front end of the front piece 10, for attachment to the fish line, which is shown at 14. A fish hook 15 is secured to the back piece 11 in any suitable manner as for instance by a ring 16. The line of draft extends through the swivel connections and along the length of the pieces 10, 11 and both of said pieces are free to turn or rotate about said line of draft on account of the swivel connections 12, 13.

Each piece or section 10, 11 is formed with an inclined direction controlling plate or surface, that is to say, with a plane or surface which is inclined with respect to the length of the piece. The inclined plane of the front piece 10, is formed by an obliquely extending curved body portion 17, which, as shown, may comprise an inclined channel or trough like part. The upper part of the body portion 17 is extended forward to form a bail like part 18, into which the attachment member 19 of the swivel connection 13 is hooked. The front piece 10, is open below the bail like part 18, and is open at the top, thereby leaving an inclined passage from front to back through which the water may pass as the piece is drawn through it. The inclined body portion 17, projects below or at one side of the line of draft and tends to move the front piece 10 in a direction transversely of the line of draft, which tendency is offset in a measure by the pull of the fish line on the piece.

The back piece or section 11, is also formed with a body portion 20, which is inclined with respect to the line of draft of the device and in its present form said body portion 20 is bowed or curved upwardly along a curved line extending between its ends. In cross section said back piece or section 11, is of a curved channel or trough shaped form, the channel or trough being on the convex side of the bowed part. The channel or trough is formed by bending the end tips 21, 21 upwards as shown. The tendency of the lengthwise bowed and curved trough like body portion is to direct the movement of the back piece 11, in a direction transversely of the line of draft in all directions when drawn through the water and this tendency is offset somewhat by the pull on the back piece by the swivel, 12.

The peculiar movements of the device, when pulled through the water, are governed by the two inclined planes or surfaces of the front and back pieces.

Movement of the front piece 10 in any direction, caused by the inclined plane 17, causes a pull on the back piece 11 in the general direction of movement taken by the front piece, and the pull on the back piece in that direction causes it to take a different course than that which would be imparted to it were it pulled in the normal line of draft. Since the back piece takes a course, at an angle to that followd by the front piece, and exerts a backward pull upon the front piece (due to the friction of the water) it pulls the rear end of the front piece in a sidewise or transverse direction and changes the angle between the inclined plane 17 and line of draft, thereby changing the direction of movement of the front piece, which in turn effects a pull on the back piece in a new direction. The result is that the entire device darts or lunges in a multiplicity of directions while being drawn along through the water. It may be suitably decorated, and it may have polished surfaces which glisten and reflect light and attract the fish. Preferably, the underside of the device is decorated to simulate a minnow or small fish, and its upper surface is polished.

In the modified form illustrated in Figs. 5 and 6, the parts are constructed as in the preferred form, except that the end tips 21ª of the back piece 11ª are curved downwards from the body portion 20ª, thereby forming the channel or trough on the underside of the body. In this form of the invention, each piece acts on the other and constantly changes the direction of movement thereof. The fish hook 15 may be rigidly secured to the back piece if desired, as shown, or may be secured thereto as in the preferred form.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. Artificial bait comprising a front piece and a back piece swiveled together, each piece having a curved trough like direction controlling surface extending in a direction which is inclined with respect to the length of the piece.

2. Artificial bait comprising a front piece and a back piece having a swivel connection therebetween, each piece having a trough like body which is curved in cross section, the bottom face of which is inclined with respect to the length of the body.

3. Artificial bait comprising a front piece and a back piece, a swivel connection between the rear end of the front piece and front end of the back piece, and fish line connection at the front end of the front piece, each piece being formed with a trough like body, the bottom face of which is inclined with respect to the length of the body.

4. Artificial bait comprising a trough like front piece and a trough like back piece both arcuate in cross section, a swivel connection therebetween and a connection for a fish line at the front end of the front piece, there being an inclined direction controlling surface on each piece, extending at an angle with respect to the length of the piece, and the one on the back piece being bowed from front to back.

5. Artificial bait comprising a trough like front piece having a forwardly extending bail for attachment to a fish line, the bottom of said trough extending at an angle with respect to the length of the front piece, a trough like back piece swiveled to said front piece and having the bottom of its trough bowed from front to back.

6. Artificial bait comprising a trough like front piece having a forwardly extending bail for attachment to a fish line, the bottom of said trough extending at an angle with respect to the length of the front piece, a trough like back piece swiveled to said front piece and having the bottom of its trough bowed from front to back, the trough being on the convex side of the body.

7. Artificial bait comprising a plurality of curved trough like joined bait members, each having a surface portion which is angularly disposed with respect to its length, whereby when the bait is drawn through water, each member changes the directions of movement of the other member.

8. Artificial bait comprising a plurality of curved trough like joined bait members, each having a surface portion which is non-aligned with respect to the length of the member, whereby when the bait is drawn through water, each member affects the movements of the other member in all directions.

PAUL B. STREICH.